(12) United States Patent
Smereka et al.

(10) Patent No.: US 9,397,770 B2
(45) Date of Patent: Jul. 19, 2016

(54) SYSTEM AND METHOD FOR PROVIDING INFORMATION LOOKUP WHILE BUFFERING RECEIVED CONTENT ON A RADIO SYSTEM

(71) Applicant: MYINE ELECTRONICS, INC., Ferndale, MI (US)

(72) Inventors: Scott W. Smereka, Warren, MI (US); Donald J. Ebben, Novi, MI (US); Jacob R. Sigal, Ferndale, MI (US)

(73) Assignee: MYINE ELECTRONICS, INC., Ferndale, MI (US)

( * ) Notice: Subject to any disclaimer, the term of this patent is extended or adjusted under 35 U.S.C. 154(b) by 0 days.

(21) Appl. No.: 14/648,595

(22) PCT Filed: Nov. 22, 2013

(86) PCT No.: PCT/US2013/071463
§ 371 (c)(1),
(2) Date: May 29, 2015

(87) PCT Pub. No.: WO2014/085247
PCT Pub. Date: Jun. 5, 2014

(65) Prior Publication Data
US 2015/0295666 A1    Oct. 15, 2015

Related U.S. Application Data

(60) Provisional application No. 61/731,817, filed on Nov. 30, 2012.

(51) Int. Cl.
*H04H 40/00* (2009.01)
*H04H 20/57* (2008.01)
*H04W 4/06* (2009.01)
*H04W 4/00* (2009.01)
*H04W 72/00* (2009.01)
*H04W 4/04* (2009.01)

(52) U.S. Cl.
CPC .............. *H04H 20/57* (2013.01); *H04W 4/008* (2013.01); *H04W 4/06* (2013.01); *H04W 72/005* (2013.01); *H04W 4/046* (2013.01)

(58) Field of Classification Search
USPC .................. 455/3.01–3.06, 41.1–41.3, 550.1, 455/556.1, 569.2
See application file for complete search history.

(56) References Cited

U.S. PATENT DOCUMENTS

2007/0136742 A1   6/2007   Sparrell
2009/0106442 A1*  4/2009   Liu ................... H04L 29/06027
                                              709/231

(Continued)

OTHER PUBLICATIONS

International Search Report and Written Opinion of the International Searching Authority for PCT/US2013/071463, mailed Feb. 14, 2014; ISA/US.

*Primary Examiner* — Fayyaz Alam
(74) *Attorney, Agent, or Firm* — Stephen T. Olson; Harness, Dickey & Pierce, P.L.C.

(57) ABSTRACT

A system is disclosed for providing supplemental information to a user receiving a broadcast of audio information. A radio system is used for wirelessly receiving broadcast content. The broadcast content may be provided with a signal component indicating that supplemental information is available for the broadcast content. A smartphone is in communication with the radio system. The radio system and the smartphone communicate to enable supplemental information from the smartphone to be presented to the user, upon a user selection, while the radio system buffers the broadcast content for playback after the supplemental information has concluded.

20 Claims, 2 Drawing Sheets

(56) References Cited

U.S. PATENT DOCUMENTS

2012/0252484 A1* 10/2012 Andrews .............. H04W 4/021
  455/456.1
2012/0272145 A1  10/2012 Ryan et al.
2013/0132605 A1*  5/2013 Kocks ................ H04N 21/262
  709/231
2015/0220223 A1*  8/2015 Michalski .............. H04H 20/74
  715/716

* cited by examiner

SYSTEM AND METHOD FOR PROVIDING INFORMATION LOOKUP WHILE BUFFERING RECEIVED CONTENT ON A RADIO SYSTEM

CROSS-REFERENCE TO RELATED APPLICATIONS

This application is a U.S. National Phase Application under 35 U.S.C. 371 of International Application No. PCT/US2013/071463 filed on Nov. 22, 2013 and published in English as WO 2014/085247 A1 on Jun. 5, 2014. This application claims the benefit of U.S. Provisional Application No. 61/731,817, filed on Nov. 30, 2012. The entire disclosures of the above applications are incorporated herein by reference.

FIELD

The present disclosure relates to radio systems, and more particularly to a system and method for use with a radio system that operates to buffer content being received by the radio system when the user selects additional information on a specific topic. The additional information may be supplied via visual prompts on a display of the radio system. When the additional information is finished being presented to the user the radio system may begin playing back the buffered content.

BACKGROUND

The statements in this section merely provide background information related to the present disclosure and may not constitute prior art.

Presently there is no easy and convenient way to provide specific information prompts to a user travelling in a motor vehicle, such as a car or truck, which alerts the user to the opportunity to obtain additional, detailed information on a specific topic being discussed in a received broadcast by the vehicle's radio system. For example, during a talk radio show on the economy, the "Gross Domestic Product" ("GDP") of the United States may be mentioned during the broadcast. If the user is not familiar with what the term "GDP" means, this can detract from the user's overall understanding of the subject matter of the broadcast. But if the opportunity presented itself to the user where the user could immediately interrupt (i.e., effectively pause) the broadcast while she/he accessed another information source to obtain additional information on what "GDP" means, this would be a significant benefit to the user. The problem, however, is that with a broadcast being received from a radio station or other content source, such as for example an AM or FM broadcast, there has been no way for the user to "pause" the broadcast. Moreover, there is no way for the user to quickly and easily access a different information source, in this example a source that would provide a brief explanation of what "GDP" means. This is especially so when the user is travelling in a motor vehicle. And still further, even if the user was able to somehow "pause" the broadcast, when the user returns to listening to the broadcast, the user will have missed that portion of the broadcast that occurred while she/he was listening to the additional information.

At present, if the user is listening to a broadcast while travelling in his/her vehicle, the user is likely limited to using a 3G or 4G cellular network along with her/his smartphone to perform a search for the additional desired information. Obviously, this will require the user to be accessing her/his smartphone and viewing additional content presented on the smartphone. This can be cumbersome, highly inconvenient and/or undesirable while the user is driving a motor vehicle. There is also a growing effort by cities to pass laws and ordinances prohibiting use of a smartphone while driving unless the smartphone is used in a "hands free" manner. Moreover, there still is no way for the user to effectively "pause" the broadcast being received by the vehicle radio while the user reads, or listens to, the additional content on her/his smartphone.

SUMMARY

In one aspect the present disclosure relates to a system for providing supplemental information to a user receiving a broadcast of audio information. The system may comprise a radio system for wirelessly receiving broadcast content, the broadcast content being provided with a signal component indicating that supplemental information is available for the broadcast content. A smartphone may also be provided which is in communication with the radio system. The radio system and the smartphone are in communication. The supplemental information may be provided from at least one of the smartphone or the radio system, upon a user selection, while the radio system buffers the broadcast content for playback after the supplemental information has concluded.

In another aspect the present disclosure relates to a system for providing supplemental information to a user operating a motor vehicle and receiving a broadcast of audio information. The system may comprise a radio system disposed in the vehicle for wirelessly receiving broadcast content, the broadcast content being provided with a signal component indicating that supplemental information is available for the broadcast content. A smartphone may be included which is in communication with the radio system. The radio system may include a display for displaying an indication thereon, in real time while the broadcast content is being received and played back to the user by the radio system, that the supplemental information is available for use and pertains to the broadcast content. A processor may be included which is in communication with the display for detecting when the user has selected the supplemental information, and controlling buffering of the broadcast content. The smartphone may be used to provide the supplemental information to the radio system for use by the user while the broadcast content is being buffered. The radio system may be used to play back the buffered broadcast content after the supplemental information concludes.

In still another aspect the present disclosure relates to a method for providing supplemental information to a user receiving broadcast content from a remote content source. The method may comprise wirelessly receiving the broadcast content from the broadcast source. The broadcast content may be provided with a signal component indicating that supplemental information is available for the broadcast content. The broadcast content may be played over a radio system. A smartphone may be used to communicate with the radio system. The smartphone may be used to provide supplemental information to the radio system, where the supplemental information is selectable by the user. Upon selection of the supplemental information by the user, the playback of the broadcast content may be interrupted and playback of the supplemental information may be commenced using the radio system while buffering the broadcast content. When the playback of the supplemental information has concluded, then playback of the buffered broadcast content from a point where the broadcast content was interrupted may be commenced.

BRIEF DESCRIPTION OF THE DRAWINGS

The drawings described herein are for illustration purposes only and are not intended to limit the scope of the present disclosure in any way. In the drawings.

DETAILED DESCRIPTION

Figure 1:
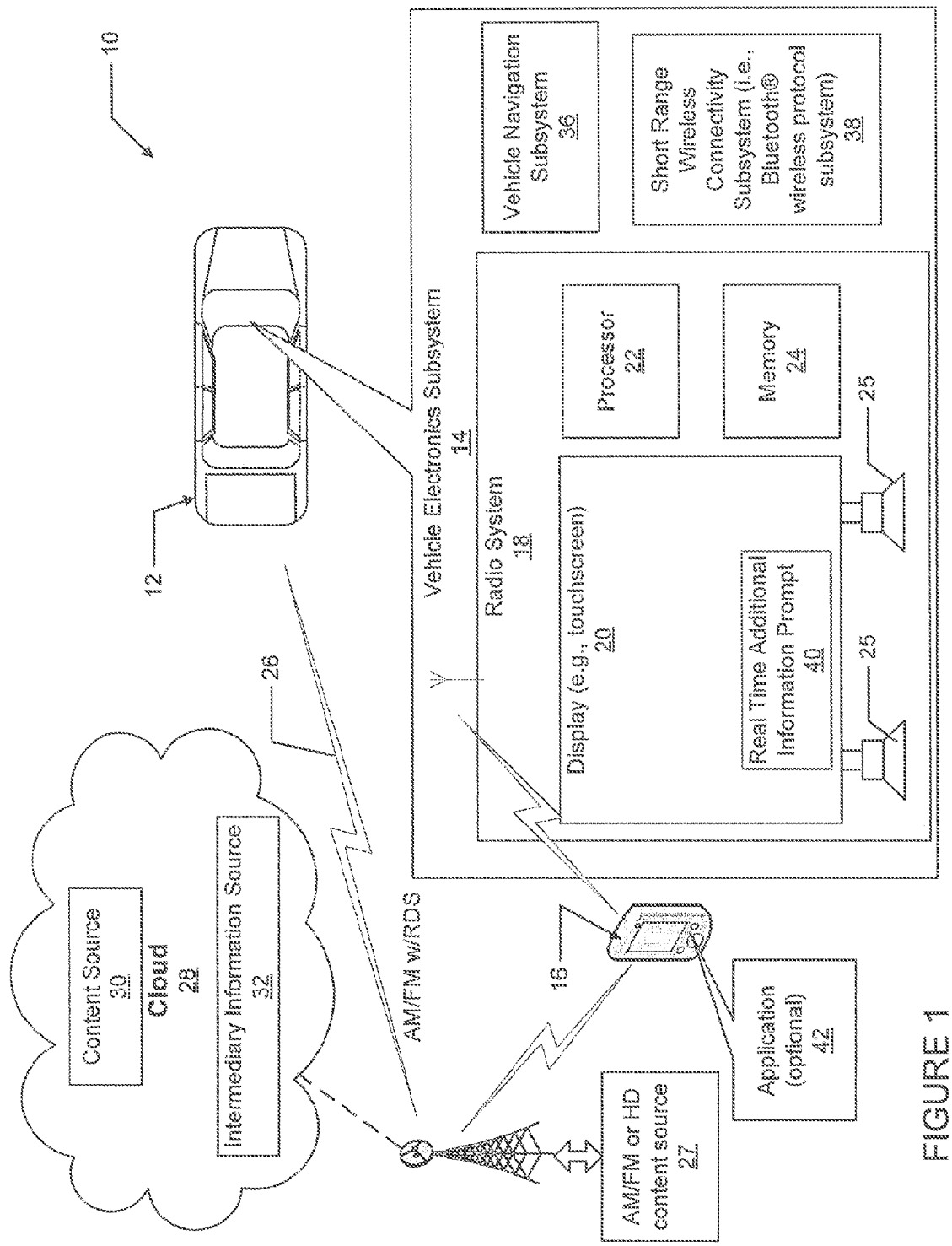
FIG. 1 is a high level block diagram of a system in accordance with one embodiment of the present disclosure in which a broadcast being received from a broadcast source is able to be paused by the user while the user accesses a different information source, to obtain additional information on some specific topic what has been mentioned in the broadcast, without missing any of the broadcast.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a system 10 in accordance with one embodiment of the present disclosure. The system 10 may include a vehicle 12 that includes a vehicle electronics subsystem 14. A user may have her/his smartphone 16 present in the vehicle 12. The vehicle electronics subsystem 14 may include a radio system 18 having a display 20, which may be a touchscreen display or a conventional display. The radio system 18 may also include a processor 22 and a non-volatile memory 24 for buffering content received via a broadcast 26 from a broadcast source 27. The broadcast source 27 may be an AM signal source, an FM signal source, an HD signal source, a DAB signal source, or virtually any other signal source able to broadcast a wireless signal for reception by a motor vehicle radio system. Advertising content may be stored at the broadcast source 27. One or more speakers 25 may be used to provide audio to the user.

Alternatively the content and/or advertisements may be obtained from a source located in the cloud 28, as indicated by content source 30, by the user's smartphone 16, and then supplied by the smartphone to the radio system 18. An intermediary content source 32 may also be based in the cloud 28 so as to be accessible by the user's smartphone 16 in real time. This feature will also be explained in greater detail in the following paragraphs. The smartphone 16 may be running an iOS® operating system available from Apple Computing, Inc., of Palo Alto, Calif. ("Apple"), or it may be running an ANDROID® operating system from Google, Inc., or it may have any other suitable operating system running thereon. The smartphone 16 may obtain advertising content from the content sources 30 and/or 32 if needed.

The vehicle electronics subsystem 14 may also include a vehicle navigation subsystem 36 and a short range, wireless connectivity subsystem 38 for making a short range, wireless connection with the user's smartphone 16. While not shown, it will be appreciated that the smartphone 16 will also include its own short range, wireless connectivity subsystem for wireless interfacing with the wireless connectivity subsystem 38. The wireless connectivity subsystem 38 in one embodiment may be a Bluetooth® protocol wireless, connectivity subsystem, although any other suitable wireless connectivity subsystem may be employed.

The AM/FM or HD content being received by the radio system 18 via broadcast 26 may include a data feed that is transmitted concurrently with the audio content. One example of the data feed may be an RDS information feed. However, any other type of data feed could also be used. For convenience, the following discussion will assume that an RDS feed is being supplied as part of broadcast 26.

In this example the RDS information may include files that are presented on the radio system display 20 as prompts indicating that additional information may be accessed by the user. So if the user is listening to a talk show in which the economy is being discussed, the broadcast 26 may include RDS information that provides files indicating to the user that additional information is available for specific topics being discussed. For example, RDS information may include files indicating that additional information may be obtained on what Gross Domestic Product ("GDP") means or what the "ISM" (Institute for Supply Management) manufacturing index means. The specific files may cause an information prompt, such as prompt 40 indicated in FIG. 1, to be displayed on the display 20 of the radio system 18 as the user is listening to the broadcast 26 being received. The information prompt 40 may be a short textual notification, for example a textual notation that additional information is available for "GDP" or "ISM Manufacturing Index." If the user selects the information prompt, then the broadcast 26 will be buffered in the non-volatile memory 24 while the processor 22 uses the file just received in the RDS feed, along with the user's smartphone 16, to obtain real time additional information from the intermediary information source 32 in the cloud 28. The additional information will then be sent back through the user's smartphone 16 to the radio system 18 and played back on the radio system. When the additional information is finished playing, the radio system 18 will begin playing the buffered content that has been stored in the non-volatile memory 24. In this manner the user will not miss any of the broadcasted content from the broadcast source 27 while she/he is listening to the additional information. A significant advantage is that the additional information is supplied in essentially real time to the user while the broadcast 26 is effectively being "paused."

In another embodiment of the system 10 an application 42 may be running on the user's smartphone 16, and the application 42 may be used to generate the prompt 40 via the short range, wireless communications link with the radio's wireless protocol subsystem 38. For example, the application 42 running on the smartphone 16 may be a "touring" application that provides information on attractions or historical information in the local area that the user is travelling through. The user may be notified when information is available by the processor 22 generating the prompt 40 on the display 20 while she/he is listening to content being broadcast from the broadcast source 27 on the vehicle's radio system 18. The user may then touch the prompt 40 on the display 20 (assuming display 20 is a touchscreen display) and the content being received and played on the radio system 18 will begin being buffered in the non-volatile memory 24 while the smartphone 16 supplies the additional information to the radio system 16 for playback. When the additional information is finished, the buffered content in the non-volatile memory 24 begins playing back on the radio system 18. The additional information may be obtained by the smartphone 16 by having the smartphone contact the intermediary content source 32 in the cloud, or the additional content may be part of the application 42 stored on the smartphone 16. In this manner as the user drives through an area, different textual information prompts may periodically be presented on the display 20 which the user may select to periodically obtain additional information on the area she/he is travelling through.

As yet another example, the application 42 running on the smartphone could be a speed trap alerting application that alerts the user to different speed traps in the vicinity of his real time location. If the vehicle 12 comes within a predetermined proximity of a known speed trap, the application 42 may generate the textual information prompt 40 on the display 20 that notifies the user that she/he is relatively close to a known speed trap. The vehicle's real time location may be determined by information provided from the vehicle's navigation system 36 or possibly even a navigation subsystem of the smartphone 16. If the user selects the prompt 40 on the display 20, then a map may be presented on the display 20 showing exactly where the speed trap is. Alternatively, the broadcast 26 being received may be buffered in the non-volatile memory 24 and an audio message may be played to the user describing details of the known speed trap (e.g., "Police car with radar often parked on westbound side of ABC Avenue in parking lot of XYZ Municipal Building next to 16$^{th}$ Street). After the audio message is played, the buffered content stored in the non-volatile memory 24 may then continue playing back on the radio system 18.

Those skilled in the art will appreciate that virtually any type of short message or item of information may be presented to the user using the prompt 40. And while the prompt 40 has been described as a textual prompt, it will be appreciated that the prompt 40 could be provided as an audible prompt that only very briefly interrupts the playback of the broadcast the user is listening to, such as for example a short chime less than one second in duration. Still further, a physical prompt, such as a short vibration of a seat or steering wheel, could be implemented to alert the user that additional information is available while the broadcast 26 is being listened to. In the latter instance no interruption of the audio being listened to by the user would be required. However, it is anticipated that the user will in most instances appreciate the generation of a short textual message (i.e., prompt 40) on the display 20 that provides some quick insight into the topic/nature of the additional information that is available.

Figure 2:
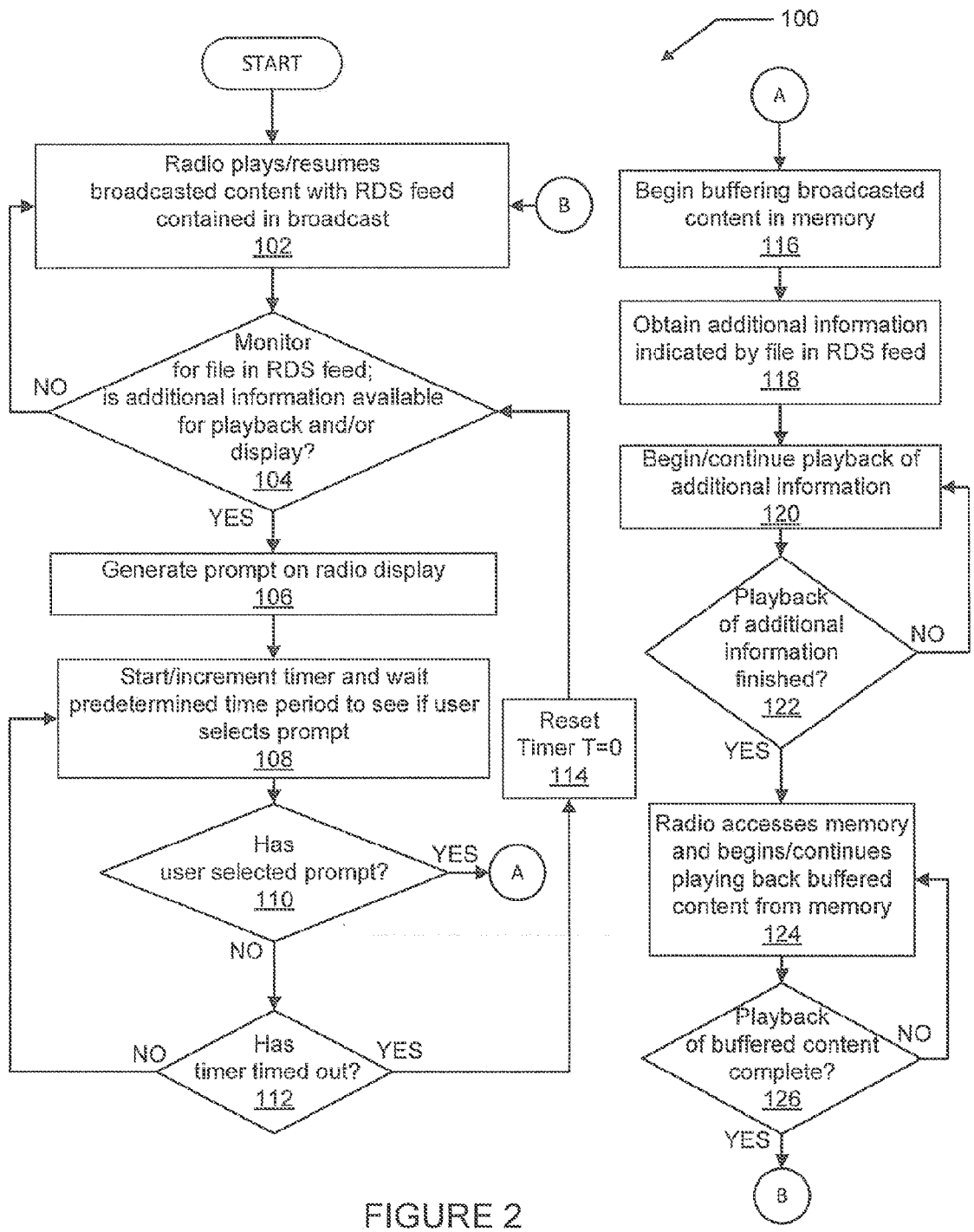
FIG. 2 is a flowchart of one example of operations that may be performed by the system of FIG. 1 in providing a listener the opportunity to obtain additional information on a topic during a broadcast, without missing any of the broadcast.

Referring to FIG. 2, a flowchart 100 is shown for one example of various operations that may be carried out by the radio system 18 of FIG. 1. At operation 102 the radio system 18 plays the broadcasted content 26, which represents a "live" feed, with a data feed, for example an RDS feed, transmitted along with the broadcasted content. At operation 104 the radio system 18 (e.g., the processor 22) monitors for a file in the RDS feed to determine if and when additional information is available for playback to the user. The presence of the file in the RDS feed indicates that a prompt 40 for additional information is to be generated for a specific item of information which is pertinent to the subject matter of the broadcast 26. If no file is contained in the RDS feed, then operation 102 is repeated. If the check at operation 104 detects that the file has been received in the RDS feed, then the radio system 18 generates the prompt 40 on the display 20 of the radio system 18, as indicated at operation 106. It will be appreciated that the prompt 40 could by an audio prompt or possibly a visual prompt, such as indicating on the display 20 to press a specific button on the radio system 18.

At operation 108 a timer is then started (decremented or incremented), while the radio system 18 waits a predetermined time to see if the user selects the prompt 40 that has been generated on the display 20. The user may select the prompt 40 by touching it, provided the display 20 is a touchscreen display, or the prompt 40 itself may indicate which button on the radio system 18 to press to make the selection. It will be assumed for discussion purposes that the radio display 20 in this instance is a touchscreen display, and the user merely has to touch the display 20 at the spot where the prompt 40 is being displayed.

At operation 110 the radio system 18 checks for the selection of the prompt 40 by the user. If no selection is detected, then a check is made to see if the timer has timed out, as indicated at operation 112. If the check at operation 112 produces a "No" answer, then the timer is either incremented or decremented, as indicated at operation 108. If no selection is received within the predetermined time period (e.g., 10 seconds), then the timer may be reset, as indicated at operation 114, and the radio system 18 may continue monitoring the RDS feed to detect when another file is received in the RDS feed, as indicated at operation 104.

If the check at operation 110 indicates the user has selected the prompt 40, then at operation 116 the radio system 18 determines what additional content is to be obtained, per the data in the RDS feed, and then obtains the additional information, and then confirms that the additional information is ready and available for playback. In this regard the additional information in the RDS feed may include a web link which directs the user's smartphone where to go to obtain the additional information. The additional information may be obtained by using the user's smartphone 16 to access the remote intermediary information source 32 as described in connection with FIG. 1. The remote information source 32 may be any one or more distinct sources of information, for example a source similar to Wikipedia.com, that provides information on a wide variety of topics and subjects, in other words essentially an on-line encyclopedia.

At operation 118 the radio system 18 sets a timestamp equal to zero (Ts=0) that identifies exactly where (i.e., point in time) the buffered portion of the live feed broadcast 26 needs to be resumed once the additional information is done playing or has otherwise been concluded or interrupted. At operation 118 the processor 22 also begins buffering the live feed broadcast 26 in the non-volatile memory 24, beginning at Ts=0. At operation 120 the radio system 18 begins the playback of the additional information over the speakers 25. To the user this appears as a virtually seamless, substantially instantaneous transition from one content source to another content source. At operation 122 a check is made if the playback of the additional information has finished or has otherwise been interrupted, such as if the user has changed the channel on the radio system 18. If the check at operation 122 produces a "No" answer then operation 120 is repeated. When the check at operation 122 detects that the playback has finished or that the playback has been interrupted, the radio system 18 accesses the non-volatile memory 24 and then begins playing back the buffered content that has been stored in the non-volatile memory 24, as indicated at operation 124. To detect when the playback has finished or has been interrupted, the Bluetooth protocol SPP (Serial Port Profile) may be used. It will be appreciated that when using SPP, when the device streaming the audio stops streaming audio for any reason, such as when the user pauses or stops the playing content, at the end of audio, etc., then the SPP channel is closed. The other device receiving the streamed audio then receives a notification that the SPP channel closed. This notification functionality is included in the Bluetooth protocol stack.

At operation 126 a check is then made if the playback of the buffered content is complete and, if not, operations 124 and 126 are repeated until the check at operation 126 indicates that playback of the buffered content is complete. When playback of the buffered content is complete, the radio system 18 resumes playback of the broadcast 26 at operation 102.

In still another embodiment the system 10 may incorporate a lookup feature for looking up information on businesses or establishments in proximity to the user's real time location while the user is travelling in the vehicle 12. As one example, consider that the user is travelling in the vehicle 12 and passes an interesting looking restaurant establishment entitled "Jack's Awesome Pub". The user may obtain information on this establishment by making a selection from a suitable control on the radio system 18 that provides indications of all commercial establishments within a predetermined distance of the vehicle's 12 real time location, for example within one-half mile of the vehicle's real time location. The establishments may be provided in a list on the display of the radio system 18 or they may be provided in some other form, such as by icons with text callouts on a map of the vehicle's real time location being shown on the radio system's display 20, where the text call outs give the names of all the establishments being shown on the map. In either instance, when the user selects the establishment named "Jack's Awesome Pub", the radio system 18 may pause the current content being played and may look up information from a remote information source that provides details on "Jack's Awesome Pub". The details may involve, for example, user reviews, menu items, current specials, hours of operation, etc. This information may then be played back to the user over the radio system 18 while the broadcast that the user was previously listening to is queued. Once the information on "Jack's Awesome Pub" has finished playing, the queued content starts playing (i.e., playing from the same spot that it left off from).

The system 10 and methodology of the present disclosure thus provides an easy and convenient means for a user to obtain additional information while listening to a broadcast on a radio, and where the additional information can be seamlessly presented to the user without the user having to miss any portion of the broadcast. The system 10 and methodology of the present disclosure can thus add significantly to the user's enjoyment and understanding of various topics of information being listened to on the user's radio system. And while the present disclosure has been discussed in connection with a radio system 18 in a vehicle 12, it will be appreciated that the system 10 may be employed in other environments, such as in connection with a radio system in the user's home, with little or no modification. The system 10 may also be used when the user is listening to streaming content from a remote content source over a wide area network (e.g., the Internet), rather than a traditional broadcast from an AM/FM or HD broadcast source.

It will also be appreciated that while the system 10 has been described in connection with supplying additional information on a given subject or topic, it is just as possible that the additional information could be music from the artist that the user had just been listening to during the broadcast, assuming that it was music that the user was listening to. As such, the additional information may be verbal information or music that is played back on the radio system 10 while the broadcast is being buffered.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for providing supplemental information to a user receiving a broadcast of audio information, the system comprising:
    a radio system for wirelessly receiving broadcast content, the broadcast content being provided with a signal component indicating when the supplemental information has become available for the broadcast content, and the radio system displaying information notifying the user that the supplemental information has become available;
    a smartphone, independent of the radio system but in communication with the radio system; and
    the radio system and the smartphone communicating to enable the supplemental information to be retrieved using the smartphone and to be presented to the user, upon a user selection, while the radio system buffers the broadcast content for playback after the supplemental information has concluded.

2. The system of claim 1, wherein the radio system includes:
    a display for displaying an indication thereon, in real time, and while the broadcast content is being received and played back to the user by the radio system, that the supplemental information is available;
    a processor in communication with the display for detecting when the user has selected the supplemental information for use; and
    a memory in communication with the processor for buffering the broadcast content being received while the supplemental content is being played over the radio system.

3. The system of claim 1, wherein the display comprises a touchscreen display.

4. The system of claim 1, wherein the processor applies a timestamp to the broadcast content to denote where playback of the buffered broadcast content is to be resumed after the supplemental information has concluded.

5. The system of claim 1, wherein each of the smartphone and the radio system include subsystems for cooperating to establish a short range wireless communications link between them.

6. The system of claim 2, further comprising a navigation system for assisting in providing real time information for use on the display, the real time information pertaining to business establishments within a predetermined vicinity of the smartphone.

7. A system for providing supplemental information to a user operating a motor vehicle and receiving broadcast content from a remote content source, the system comprising:
    a radio system disposed in the vehicle for wirelessly receiving the broadcast content, the broadcast content being provided with a signal component indicating when the supplemental information becomes available for the broadcast content;
    a smartphone, independent of the radio system, but in communication with the radio system;
    the radio system including:
        a display for displaying an indication thereon, in real time and while the broadcast content is being received and played back to the user by the radio system, that the supplemental information has become available and pertains to specific information concerning the broadcast content;
        a processor in communication with the display for detecting when the user has selected the supplemental information, and buffering the broadcast content;

wherein the smartphone is used to provide the supplemental information to the radio system for use by the user while the broadcast content is being buffered; and wherein the radio system is used to play back the buffered broadcast content after the supplemental information concludes.

8. The system of claim 7, wherein the signal component comprises a Radio Data System (RDS) feed embedded in the broadcast content.

9. The system of claim 7, wherein the radio system includes a memory for storing the buffered broadcast content.

10. The system of claim 7, wherein the supplemental information is obtained wirelessly by the smartphone by using the smartphone to access a remote information source via a wide area network.

11. The system of claim 7, wherein the radio system is configured to apply a time stamp to the broadcast signal when the user selects the supplemental information for use, the time stamp enabling the processor to determine exactly where the broadcast content needs to be resumed once a presentation of the supplemental information has concluded.

12. The system of claim 7, wherein the supplemental information is provided as audio information and played back to the user using the radio system.

13. The system of claim 7, wherein the supplemental information is available on the smartphone.

14. The system of claim 7, wherein the indication that the supplemental information is available is displayed on the radio system for a predetermined time by the radio system, while the radio system monitors if the user has selected the supplemental information for use.

15. The system of claim 7, further comprising an application configured to notify the radio system when additional supplemental information is available for use by the user.

16. The system of claim 7, wherein the application is configured to run on the smartphone and to communicate with the radio system via a wireless, short range communications link.

17. The system of claim 7, further comprising a navigation system configured to determine a real time location of the user while the user is using the radio system, and to help provide information to the radio system regarding business establishments within a predetermined vicinity of the real time location of the radio system.

18. A method for providing supplemental information to a user receiving broadcast content from a remote content source, the method comprising:

wirelessly receiving the broadcast content from the broadcast source, the broadcast content being provided with a signal component indicating that the supplemental information is available for the broadcast content;

playing the broadcast content over a radio system;

using a smartphone, independent of the radio system, but in communication with The radio system, to communicate with the radio system;

using the smartphone to provide the supplemental information ion to the radio system that is selectable for use by the user;

providing a notification on the display of the radio system when the supplemental information has become available for use, based on at least one of specific subject matter being presented in said broadcast content or a real time location of the user;

upon selection of the supplemental information by the user, interrupting the playback of the broadcast content and playing back the supplemental information using the radio system while buffering the broadcast content; and when the playback of the supplemental information has concluded, then playing back the buffered broadcast content from a point where the broadcast content was interrupted.

19. The method of claim 18, further comprising using the smartphone to access an additional remote content source via a wide area network, the additional remote content source providing at least a portion of the supplemental information.

20. The method of claim 18, wherein the supplemental information is selectable by providing at least one of:

a touchscreen of a display system upon which an indicator of the availability of the supplemental information is presented, and which causes said supplemental information to be selected when the indicator is touched; and a control on the display system which when touched by the user causes the selection of the supplemental information for playback.

* * * * *